(12) United States Patent
Lee

(10) Patent No.: US 7,616,413 B2
(45) Date of Patent: Nov. 10, 2009

(54) LEAKAGE CURRENT INTERRUPTER

(75) Inventor: Won-Ho Lee, Suwon-si (KR)

(73) Assignee: Daesung Electric Co., Ltd. (KR)

( * ) Notice: Subject to any disclaimer, the term of this patent is extended or adjusted under 35 U.S.C. 154(b) by 271 days.

(21) Appl. No.: 11/158,801

(22) Filed: Jun. 22, 2005

(65) Prior Publication Data
US 2006/0119997 A1 Jun. 8, 2006

(30) Foreign Application Priority Data
Dec. 3, 2004 (KR) .................... 10-2004-0101423

(51) Int. Cl.
H02H 3/00 (2006.01)
(52) U.S. Cl. ........................................ 361/42
(58) Field of Classification Search ............ 361/42
See application file for complete search history.

(56) References Cited
U.S. PATENT DOCUMENTS
6,738,241 B1 * 5/2004 Aromin .................. 361/42
2004/0228048 A1 * 11/2004 Aromin .................. 361/2

OTHER PUBLICATIONS
RV410: Low Power Two-wire Griund Fault Interrupter Controller, Aug. 1997, Raytheon Electronics, pp. 1-3.*
RV4145A: Low Power Griund Fault Interrupter, Mar. 2002, Fairchild Semiconductor, pp. 1-7.*

* cited by examiner

Primary Examiner—Stephen W Jackson
Assistant Examiner—Nicholas Ieva
(74) Attorney, Agent, or Firm—Cantor Colburn LLP

(57) ABSTRACT

A leakage current interrupter is provided. The leakage current interrupter includes: a leakage current detector having resistors connected to the external metal cover of the power cable, and generating a voltage corresponding to a leakage current through the resistors when the leakage current flows through the external metal cover of the power cable; a power source connected to the power line and the neutral line to generate DC power when AC power is applied through the power line and the neutral line; a power interrupter opening the power line and the neutral line when the DC power is applied; and a controller applying the DC power to the power interrupter when the leakage current detector generates a voltage. Therefore, it is possible to reduce manufacturing cost, and to provide a self-test function to the leakage current interrupter to increase the operation reliability of the leakage current interrupter. Therefore, it is possible to reduce manufacturing cost, and to provide a self-test function to the leakage current interrupter to increase operation reliability of the leakage current interrupter.

5 Claims, 2 Drawing Sheets

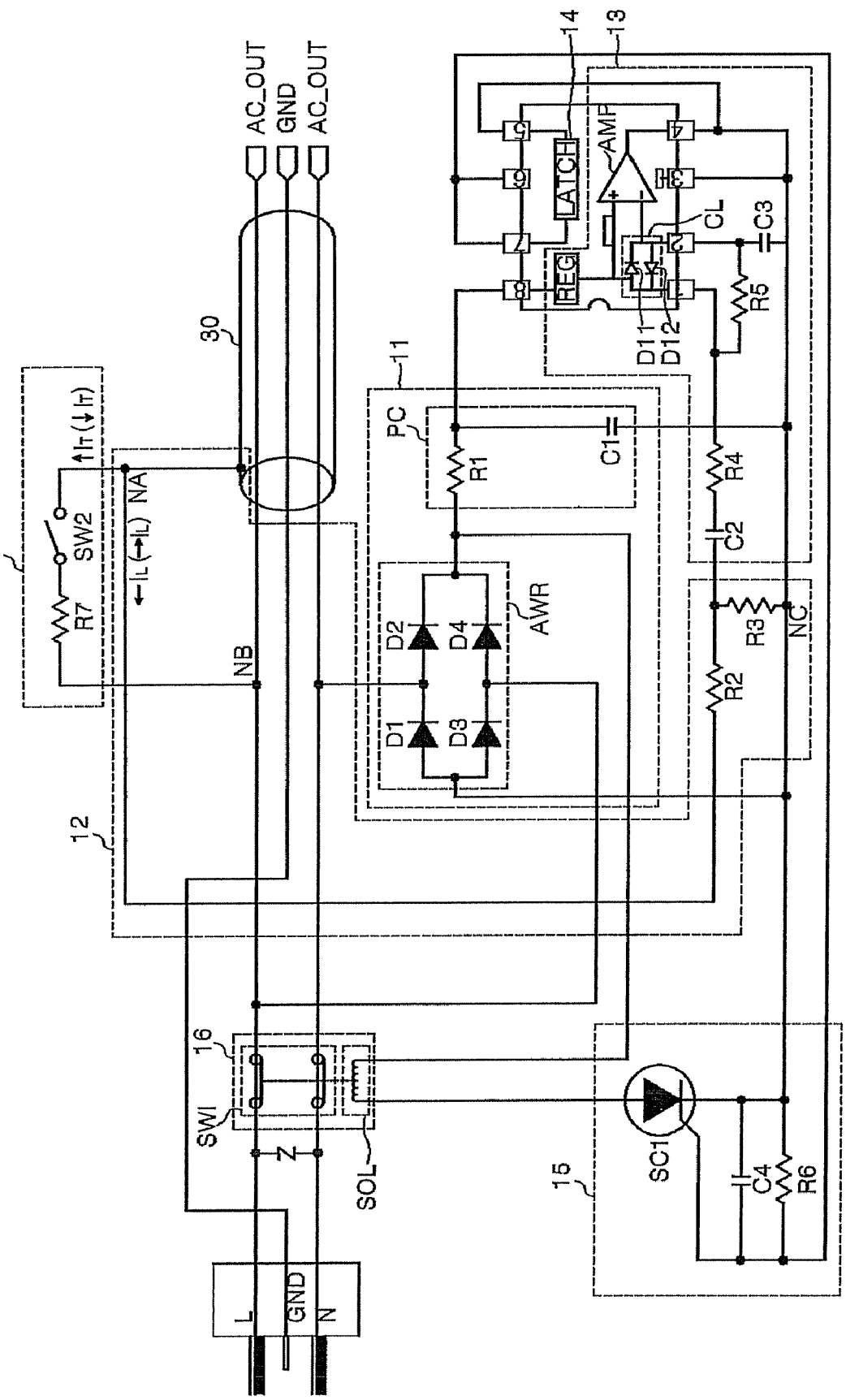

LEAKAGE CURRENT INTERRUPTER

CROSS-REFERENCE TO RELATED APPLICATION

This application claims the benefit of Korean Patent Application No. 2004-101423, filed Dec. 3, 2004, the disclosure of which is hereby incorporated herein by reference in its entirety.

BACKGROUND OF THE INVENTION

1. Field of the Invention

The present invention relates to an electric power system and, more particularly, to a leakage current interrupter capable of detecting and interrupting a leakage current when current leaks from a power cable.

2. Description of the Related Art

A leakage current interrupter, which is used in an electric power system, functions to prevent an accident from occurring by detecting a leakage current through an appropriate circuit, and interrupting a power line, when current leaks from an electric power system.

A conventional leakage current interrupter includes a transformer connected to an external metal cover of a power cable in order to detect a leakage current, an electric shock and a short circuit, and the transformer generates a voltage corresponding to the leakage current flowing through the external metal cover of the power cable. That is, the conventional leakage current interrupter determines whether the leakage current exists or not through the transformer, and interrupts the leakage current.

However, since the conventional leakage current interrupter should use a separate transformer to detect the leakage current, and perform a leakage current interrupting function therethrough, the manufacturing cost and product size of the leakage current interrupter increase.

SUMMARY OF THE INVENTION

In order to solve the foregoing and/or other problems, it is an aspect of the present invention to provide a leakage current interrupter capable of remarkably decreasing manufacturing cost and product size by detecting a leakage current through a resistor.

It is another aspect of the present invention to provide a leakage current interrupter capable of providing a self-test function.

Additional aspect and advantages of the present invention will be set forth in part in the description which follows and, in part, will be obvious from the description, or may be learned by practice of the invention.

The foregoing and/or other aspects of the present invention may be achieved by providing a leakage current interrupter including: a leakage current detector having resistors connected to the external metal cover of the power cable, and generating a voltage corresponding to a leakage current through the resistors when the leakage current flows through the external metal cover of the power cable; a power source connected to the power line and the neutral line to generate DC power when alternating current (AC) power is applied through the power line and the neutral line; a power interrupter opening the power line and the neutral line when the DC power is applied; and a controller applying the DC power to the power interrupter when the leakage current detector generates a voltage.

BRIEF DESCRIPTION OF THE DRAWINGS

These and/or other aspects and advantages of the present invention will become apparent and more readily appreciated from the following description of the embodiments, taken in conjunction with the accompanying drawings of which:

FIG. 2 is a detail circuit diagram of the leakage current interrupter of FIG. 1.

DETAILED DESCRIPTION OF THE INVENTION

Figure 1:
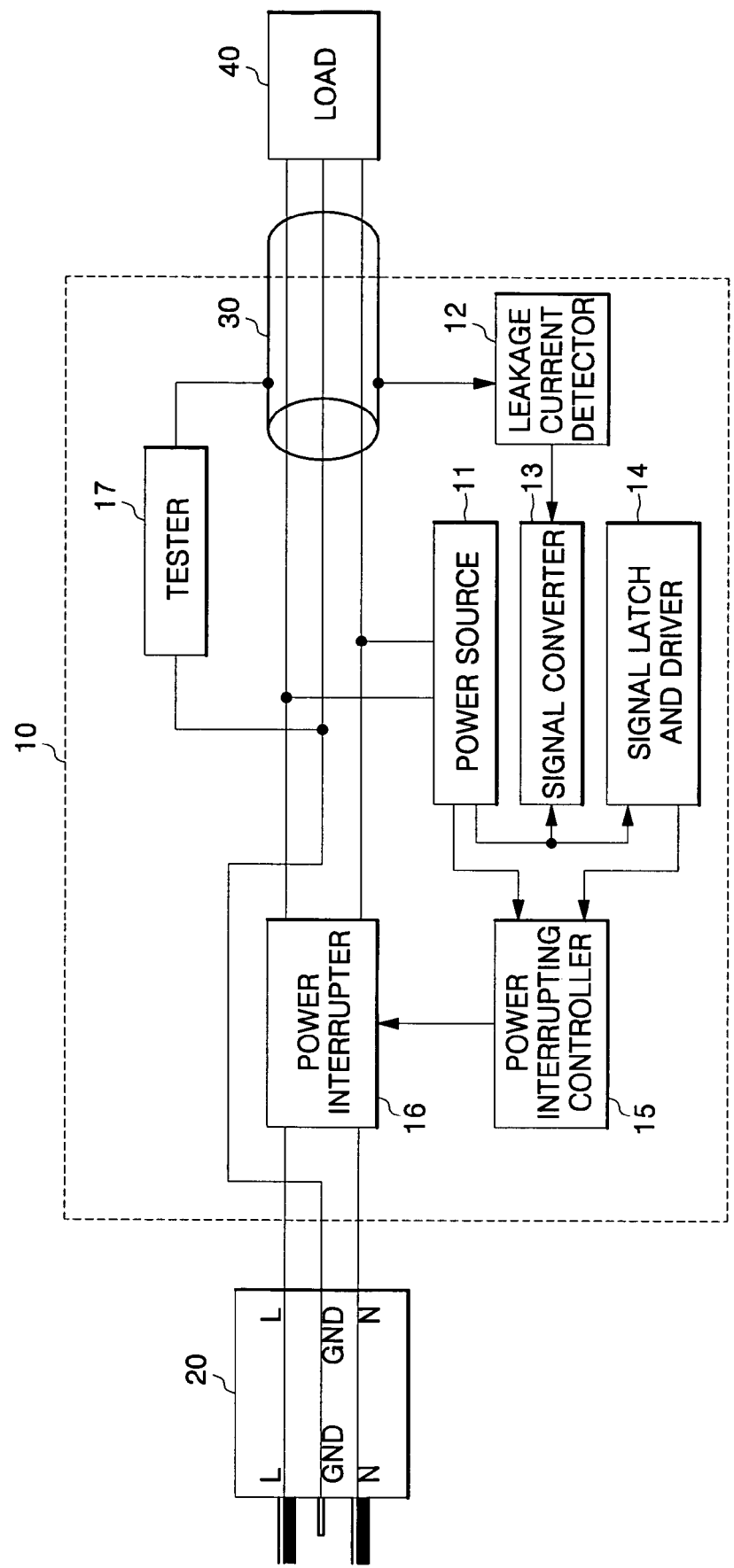
FIG. 1 is a block diagram of the interior of a leakage current interrupter in accordance with the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures.

FIG. 1 is a block diagram of the interior of a leakage current interrupter in accordance with the present invention.

As shown in FIG. 1, the leakage current interrupter 10 of the present invention is connected to an electric outlet 20 and a power cable 30, and includes a power source 11, a leakage current detector 12, a signal converter 13, a signal latch and driver, a power interrupting controller 15, a power interrupter 16, and a tester 17.

The power source 11 is connected to a power line L and a neutral line N to receive an alternating current (AC) power source, to thereby generate operating power for interrupting the connection of the electric outlet 20 and the power cable 30, and internal operating power of the signal converter 13 and the signal latch and driver 14.

The leakage current detector 12 is connected to an external metal cover of the power cable 30 to detect whether current leaks from the power cable 30, and generates a voltage corresponding to the leakage current, when the current leaks.

When the voltage for informing that the leakage current is generated is applied from the leakage current detector 12, the signal converter 13 generates a leakage current detection signal in response to the voltage. The signal latch and driver 14 generates a power interrupting signal in response to the leakage current detection signal, and applies the signal to the power interrupting controller 15.

The power interrupting controller 15 provides the operating power of the power source 11 to the power interrupter 16 when the power interrupting signal is received, and the power interrupter 16 opens the power line L and the neutral line N in response to the operating power.

The tester 17 is connected to the metal cover and the power line L (or the neutral line N) of the power cable 30 to determine whether the leakage current interrupter 10 normally operates, by intentionally making leakage current generating conditions.

Therefore, in the case that the leakage current generating conditions are intentionally made on test, when the power line L and the neutral line N are opened, it means that the leakage current interrupter 10 normally operates. On the other hand, when the power line L and the neutral line N are not opened, it means that the leakage current interrupter 10 malfunctions.

FIG. 2 is a detail circuit diagram of the leakage current interrupter of the present invention.

The power source 11 includes a full-wave rectifier AWR having four diodes D1 to D4 connected to the power line L and the neutral line N and rectifying AC power to thereby generate operating power, a smoothing circuit PC having a resistor R1 and a capacitor C1 to smooth the operating power, and a regulator REG for converting the smoothed operating power to interior operating power of the signal converter 13 and the signal latch and driver 14.

At this time, the regulator REG is a device according to a conventional art, and its description will be omitted.

The leakage current detector 12 includes a resistor R2 connected to the metal cover of the power cable 30 to generate a voltage corresponding to the leakage current, and a resistor R3 connected between the resistor R2 and a node C (NC) to distribute the voltage corresponding to the leakage current.

The signal converter 13 includes a clamping circuit CL having two diodes D11 and D12 connected to the leakage current detector 12, and connected between the resistor R2 and the node C (NC), i.e., to both ends of the resistor R3 to remove an excessive voltage of the distributed voltage and convert it to a pulse signal; an amplifier AMP for amplifying an output signal of the clamping circuit CL; and resistors R4 and R5 and capacitors C2 and C3 connected to the resistors R2 and R3 to remove AC coupling.

The signal latch and driver 14 includes a latch circuit LATCH for generating a power interrupting signal when the leakage current detection signal is received from the amplifier AMP.

Here, the clamping circuit CL and the amplifier AMP of the signal converter 13, and the latch circuit LATCH of the signal latch and driver 14 are devices according to a conventional art, and their descriptions will be omitted. In addition, the clamping circuit CL, the amplifier AMP, the latch circuit LATCH, and the regulator REG may be formed as one chip through a conventional art.

The power interrupting controller 15 includes: a thyristor SC1 having a control electrode connected to the signal latch and driver 14, an anode connected to the power interrupter 16, and a cathode connected to the power source 11 to transmit the operating power in response to the power interrupting signal of the signal latch and driver 14; and a resistor R6 and a capacitor C4 connected in parallel to the control electrode and the anode of the thyristor SC1 to remove the noise of the power interrupting signal.

The power interrupter 16 includes a switch SW1 connected to the power line L and the neutral line N to short or open the power line L and the neutral line N, and a solenoid SOL disposed between an output terminal of the power source 11 and the thyristor SC1 of the power interrupting controller 15 to turn off the switch SW1 when the operating power is supplied.

The tester 17 includes a resistor R7 connected in series between the metal cover and the power line L (or the neutral line N) of the power cable 30 to generate an intentional leakage current on test, and a switch SW2. At this time, the switch SW2 is turned on by an operator.

Hereinafter, an operation of the leakage current interrupter 10 of FIG. 2 will be described.

First, the leakage current interrupter 10 is under the following conditions on its initialization.

The switch SW1 of the power interrupter 16 is turned "ON", and the power source 11 receives AC power applied through the power line L and the neutral line N to generate the operating power and the interior operating power. Then, the latch circuit LATCH of the signal latch and driver 14 generates a low level signal.

In this state, when the current leaks from the metal cover of the power cable 30, the leakage current interrupter 10 performs the following operations.

When the current leaks from the metal cover of the power cable 30, the leakage current flows through the leakage current detector 12, the resistor R2 generates a voltage corresponding to the leakage current, and the resistor R3 distributes the voltage corresponding to the leakage current to a predetermined voltage. Then, the distributed voltage, i.e., the voltage applied to both ends of the resistor R3 is applied to the clamping circuit CL, after removing the AC coupling through the resistors R4 and R5 and the capacitors C2 and C3.

The clamping circuit CL removes an excessive voltage of the distributed voltage to generate a pulse signal, the amplifier AMP amplifies the pulse signal to generate a leakage current detection signal, and the latch circuit LATCH generates and latches a high level signal, i.e., a power interrupting signal in response to the leakage current detection signal.

The thyristor SC1 of the power interrupting controller 15 is turned "ON" in response to the power interrupting signal.

As a result, a current path is formed through the full-wave rectifier AWR, the solenoid SOL, and the thyristor SC1, and the solenoid SOL receives the operating power to generate a predetermined magnetic field and turn "OFF" the switch SW1. That is, the switch SW1 of the power interrupter 16 opens the power line L and the neutral line N.

Therefore, the power source 11 cannot receive the AC power through the power line L and the neutral line N and generate the operating power and the interior operating power, and the signal converter 13 and the signal latch and driver 14 cannot receive the interior operating power to be non-activated.

That is, the leakage current interrupter 10 is non-activated and the power line L and the neutral line N maintain a current state until a user physically initializes the leakage current interrupter 10.

As described above, when the leakage current flows through the metal cover of the power cable 30, the leakage current interrupter 10 of the present invention opens the power line L and the neutral line N through the above mentioned operations and maintains the open state until the user physically initializes the leakage current interrupter 10.

Continuously, an operation of the leakage current interrupter 10 on test will be described.

On test, the switch SW2 of the tester 17 is turned "ON" by an operator.

Then, a current path between a node A (NA) and a node B (NB) is generated through the switch SW2, and a current corresponding to the intentional leakage current flows in the leakage current detector 12 through the current path.

As a result, the leakage current detector 12 performs the above mentioned operation to generate the distributed voltage, the signal converter 13 generates a leakage current detection signal in response to the distributed voltage, and the signal latch and driver 14 generates a power interrupting signal in response to the leakage current detection signal to apply the power interrupting signal to the power interrupting controller 15.

When the power interrupting signal is received, the power interrupting controller 15 provides the operating power of the power source 11 to the power interrupter 16, and the power interrupter 16 opens the power line L and the neutral line N in response to the operating power.

Therefore, the leakage current interrupter 10 of the present invention is capable of providing the same conditions as when the leakage current flows, and determining the leakage current interrupter 10 to normally operate, by intentionally varying an amount of current of the power line L and the neutral line N, even when the current does not leak from the metal cover of the power cable 30 through the tester 17.

As can be seen from the foregoing, the leakage current interrupter of the present invention is capable of remarkably reducing product size as well as decreasing manufacturing cost by detecting the leakage current using a predetermined number of resistors, i.e., the minimum number of devices, without using a transformer.

In addition, it is also possible to provide a self-test function of the leakage current interrupter to increase operating reliability of the leakage current interrupter.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A leakage current interrupter having a power line, a neutral line, and a ground line therein, which is connected to a power cable covered with an external metal cover, comprising:
    a leakage current detector having resistors connected to the external metal cover of the power cable, and generating a voltage corresponding to a leakage current through the resistors when the leakage current flows through the external metal cover of the power cable;
    a power source connected to the power line and the neutral line to generate direct current (DC) power when alternating current (AC) power is applied through the power line and the neutral line;
    a power interrupter opening the power line and the neutral line when the DC power is applied;
    a controller applying the DC power to the power interrupter when the leakage current detector generates a voltage; and
    a tester having a resistor and a switch connected in series between the external metal cover of the power cable and the power line, or between the external metal cover of the power cable and the neutral line,
    wherein, the controller comprises:
    a signal converter generating a leakage current detection signal in response to the voltage of the leakage current detector and outputting the leakage current detection signal to a first terminal;
    a signal latch and driver generating and latching a power interrupting signal in response to the leakage current detection signal and outputting the power interrupting signal to a second terminal; and
    a power interrupting controller applying the DC power to the power interrupter when the power interrupting signal is applied, and
    wherein the power source comprises:
    a full-wave rectifier full-wave rectifying the AC power transmitted through the power line and the neutral line to generate the DC power;
    a smoothing circuit for smoothing the DC power; and
    a regulator converting the DC power to an interior voltage of the controller.

2. The leakage current interrupter according to claim 1, wherein the signal converter comprises:
    a clamping circuit removing an excessive input of an output signal of the leakage current detector and generating a pulse signal; and
    an amplifier amplifying the pulse signal of the clamping circuit and outputting the amplified pulse signal to the first terminal.

3. The leakage current interrupter according to claim 1, wherein the power interrupting controller comprises a thyristor transmitting the DC power when the signal latch and driver generates the power interrupting signal to turn on the thyristor, by connecting a control electrode to the signal latch and driver, a positive terminal to the power interrupter, and a negative terminal to the power source.

4. The leakage current interrupter according to claim 1, wherein the power interrupter comprises:
    a switch closing/opening the power line and the neutral line; and
    a solenoid turning off the switch when the DC power is applied.

5. The leakage current interrupter according to claim 1, wherein the resistors comprises:
    a first resistor receiving the leakage current at one end, making the leakage current flow to the other end and generating a voltage by the leakage current; and
    a second resistor whose one end is connected to the one end of the first resistor and the other end is connected to the first terminal and distributing the voltage of the first resistor.

* * * * *